United States Patent
Tamura et al.

(10) Patent No.: US 6,558,637 B2
(45) Date of Patent: May 6, 2003

(54) EXHAUST EMISSION PURIFIER

(75) Inventors: Yasuki Tamura, Nisshin (JP); Kazuo Koga, Okazaki (JP); Kojiro Okada, Nagoya (JP); Osamu Nakayama, Toyota (JP); Keisuke Kawamura, Nagasaki (JP); Kiyoshi Kawamura, Komaki (JP); Norihiro Hukuda, Nagasaki (JP)

(73) Assignees: Mitsubishi Jidosha Kogyo Kabushiki Kaisha, Tokyo (JP); Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/832,813

(22) Filed: Apr. 12, 2001

(65) Prior Publication Data

US 2001/0036428 A1 Nov. 1, 2001

(30) Foreign Application Priority Data

Apr. 12, 2000 (JP) ........................................ 2000-110797

(51) Int. Cl.[7] ................................................ B01J 19/08
(52) U.S. Cl. ....................... 422/186.04; 60/275; 422/186
(58) Field of Search ........................... 422/186.04, 186; 60/275

(56) References Cited

U.S. PATENT DOCUMENTS

2001/0023589 A1   9/2001   Tamura et al.

FOREIGN PATENT DOCUMENTS

| JP | 05 059934 | * | 3/1993 |
| JP | 07 247827 | * | 9/1995 |
| JP | 10-266831 A | | 10/1998 |

* cited by examiner

*Primary Examiner*—K. Mayekar

(57) ABSTRACT

An exhaust emission purifier includes a catalyst unit disposed in an exhaust pipe of an engine. Electrodes (reaction adjustment unit) are provided on a honeycomb carrier of the catalyst unit in a layered form in order to apply an electric field to the vicinity of the catalyst surface to thereby adjust the catalytic reaction. An ECU serves as a status detection unit to detect factors which affect the exhaust gas purifying performance of the catalyst unit (i.e., operating conditions), and serves as a control unit which controls the electric field applied by the electrodes, on the basis of the detected operating conditions.

17 Claims, 9 Drawing Sheets

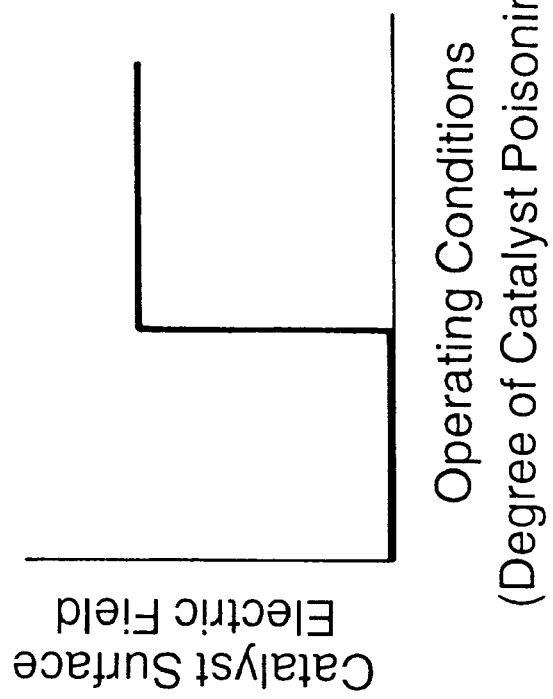
F I G. 4a
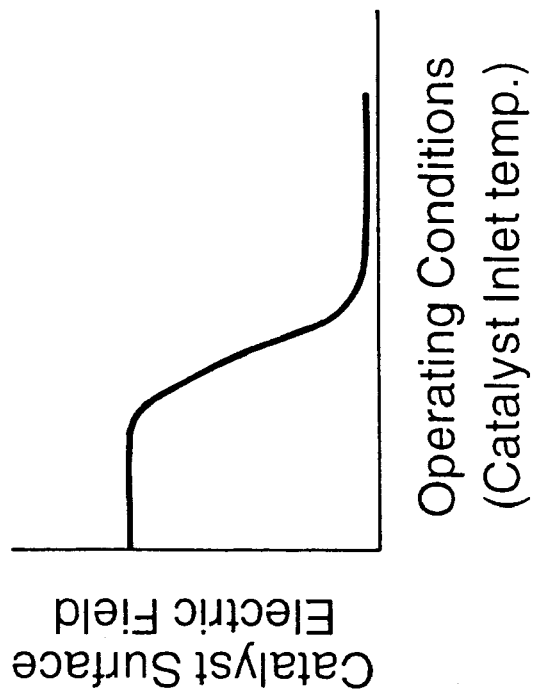
F I G. 4b

EXHAUST EMISSION PURIFIER

The entire disclosure of Japanese Patent Application No. 2000-110797 filed on Apr. 12, 2000 including specification, claims, drawings and summary is incorporated herein by reference in its entirety.

BACKGROUND OF THE INVENTION

1. Field of the Invention

The present invention relates to an exhaust emission purifier having an exhaust purifying catalyst which is disposed in an exhaust gas passage in order to remove toxic substances from exhaust gas, and which is preferably provided in an exhaust passage of an internal combustion engine or waste processing facility.

2. Description of the Related Art

An automobile on which an internal combustion engine is mounted emits exhaust gas derived from combustion within the internal combustion engine, and the exhaust gas contains toxic substances such as CO, HC, and $NO_x$. Therefore, catalyst for removing such toxic substance is provided in the exhaust system. Incidentally, such catalyst is exposed to various atmospheres. However, catalyst can maintain its purifying performance under limited conditions only, and its purifying performance may be impaired greatly, depending on operating conditions of the engine. Examples of operating conditions of the engine which greatly impair the purifying performance of catalyst include low-temperature operation, such as low-temperature startup, and idling operation; and high-temperature operation of an $NO_x$ trap catalyst at 600° C. or higher.

In order to solve the above-described drawback, a technique disclosed, for example, in Japanese Patent Application Laid-Open (kokai) No. 10-266831 has been proposed in order to effectively decompose and reduce toxic components contained in exhaust gas, irrespective of operating conditions of an engine. In the "exhaust gas purifier" disclosed in the patent publication, a three-way catalyst unit is disposed in an exhaust passage of an engine, and in the three-way catalyst unit there is provided an electric circuit for bringing toxic components contained in exhaust gas into a plasma state to thereby decompose the toxic components. When exhaust gas passes through the three-way catalyst unit, toxic components are brought into a plasma state by means of electrical power supplied from the electric circuit and are thus decomposed, and the remaining toxic components not having become plasma are removed by the three-way catalyst unit.

However, in the above-mentioned conventional exhaust gas purifier, by means of electrical power supplied from the electric circuit, toxic components contained in exhaust gas are brought into a plasma state and are decomposed directly. Therefore, the conventional exhaust gas purifier involves a problem in that a large amount of electrical power is consumed. In addition, there is a possibly that components once dissolved bond to toxic components again, so that a sufficient purifying performance cannot be obtained. Moreover, in the conventional apparatus, toxic components which have not become plasma through application of electrical power are removed by the three-way catalyst unit, as described above, and such toxic components cannot be removed reliably when the engine operates under conditions which lower the purifying performance of the catalyst.

SUMMARY OF THE INVENTION

The present invention was accomplished to solve the above-described problem, and an object of the present invention is to provide an exhaust emission purifier which has a stable exhaust purifying performance and which can conserve electrical power.

In order to achieve the above object, the present invention provides an exhaust emission purifier comprising: catalyst disposed in an exhaust gas passage in order to purify toxic substances contained in exhaust gas; reaction adjustment means for adjusting catalytic reaction through application of an electric or electromagnetic field to the vicinity of a surface of the catalyst; status detection means for detecting a factor which affects the exhaust gas purifying performance of the catalyst; and control means for controlling the electric or electromagnetic field applied by the reaction adjustment means, on the basis of the factor detected by the status detection means.

Accordingly, on the basis of the factor which affects the exhaust gas purifying performance, the control means controls the reaction adjustment means, such that the reaction adjustment means adjusts catalytic reaction through application of an electric or electromagnetic field to the vicinity of the surface of the catalyst. Therefore, stable performance for purifying exhaust gas by means of catalytic reaction can be secured, and electrical power can be conserved as compared with exhaust emission purifiers in which toxic components contained in exhaust gas are brought into a plasma state and are decomposed directly.

Preferably, the status detection means detects a factor correlated with temperature of the exhaust purifying catalyst; and when the catalytic temperature falls within a temperature range in which the performance of the catalyst decreases, the control means increases the strength of the electric or electromagnetic field to thereby promote the reaction of the exhaust purifying catalyst. Further, preferably, the control means restricts the strength of the electric or electromagnetic field applied by the reaction adjustment means so as not to exceed a discharge limit electric field.

Specifically, preferably, the status detection means detects, as the factor which affects the exhaust gas purifying performance, one selected from a parameter which affects catalyst temperature, a parameter which affects catalyst reaction performance, a parameter which affects deterioration of the purifying performance of the catalyst, and a parameter which affects the purifying performance of the catalyst for a specific exhaust gas component.

Preferably, the status detection means detects, as the parameter which affects catalyst temperature, one selected from exhaust gas temperature, engine coolant temperature, and catalyst temperature; and on the basis of the parameter which is detected by the status detection means and which affects catalyst temperature, the control means controls the electric or electromagnetic field applied by the reaction adjustment means.

Preferably, on the basis of the parameter which is detected by the status detection means and which affects catalyst temperature, the control means judges whether the catalytic temperature falls within a temperature range in which the performance of the catalyst deteriorates; and when the catalytic temperature falls within the temperature range in which the performance of the catalyst deteriorates, the control means increases the strength of the electric or electromagnetic field applied by the reaction adjustment means.

Preferably, the control means controls the strength of the electric or electromagnetic field applied by the reaction adjustment means so as not to exceed a discharge limit electric field.

Alternatively, the status detection means detects, as the parameter which affects catalyst reaction performance, one selected from engine speed, exhaust gas flow rate, and engine load; and on the basis of the parameter which is detected by the status detection means and which affects catalyst reaction performance, the control means controls the electric or electromagnetic field applied by the reaction adjustment means.

Preferably, on the basis of the parameter which is detected by the status detection means and which affects catalyst reaction performance, the control means judges whether the engine is in an operation range in which the performance of the catalyst deteriorates; and when the engine is in the operation range in which the performance of the catalyst deteriorates, the control means increases the strength of the electric or electromagnetic field applied by the reaction adjustment means.

Preferably, the control means controls the strength of the electric or electromagnetic field applied by the reaction adjustment means so as not to exceed a discharge limit electric field.

Alternatively, the status detection means detects, as the parameter which affects catalyst temperature, one selected from exhaust gas temperature, engine coolant temperature, and catalyst temperature, and detects, as the parameter which affects catalyst reaction performance, one selected from engine speed, exhaust gas flow rate, and engine load; and on the basis of the parameter which is detected by the status detection means and which affects catalyst temperature and the parameter which is detected by the status detection means and which affects catalyst reaction performance, the control means controls the electric or electromagnetic field applied by the reaction adjustment means.

Preferably, the control means judges, on the basis of the parameter which is ,detected by the status detection means and which affects catalyst reaction performance, whether the engine is in an operation range in which the performance of the catalyst deteriorates and judges, on the basis of the parameter which is detected by the status detection means and which affects catalyst temperature, whether the catalyst temperature falls within a temperature range in which the performance of the catalyst increases; and when the engine is in the operation range in which the performance of the catalyst deteriorates and the catalytic temperature falls within the temperature range in which the performance of the catalyst increases, the control means decreases the strength of the electric or electromagnetic field applied by the reaction adjustment means.

Alternatively, the status detection means detects, as the parameter which affects deterioration of the catalyst reaction performance, the degree of a specific catalyst poisoning among a plurality of catalytic poisonings; and on the basis of the degree of the specific catalyst poisoning detected by the status detection means, the control means controls the electric or electromagnetic field applied by the reaction adjustment means.

Preferably, the status detection means detects, as the parameter which affects: deterioration of the catalyst reaction performance, the degree of a specific catalyst poisoning selected from: CO poisoning, $O_2$ poisoning, $NO_x$ poisoning, and $SO_x$ poisoning; and when the degree of the specific catalyst poisoning detected by the status detection means exceeds a reference value set for the specific catalyst poisoning, the control means controls the electric or electromagnetic field applied by the reaction adjustment means in order to remove the specific catalyst poisoning to thereby regenerate the catalyst.

Alternatively, the status detection means detects, as the parameter which affects the purifying performance of the catalyst for a specific exhaust gas component, one selected from concentration of the specific exhaust gas component, emission amount of the specific exhaust gas component, and exhaust gas air-fuel ratio; and on the basis of the parameter which is detected by the status detection means and which affects the purifying performance of the catalyst for a specific exhaust gas component, the control means controls the electric or electromagnetic field applied by the reaction adjustment means.

Preferably, when, on the basis of the concentration or emission amount of the specific exhaust gas component detected by the status detection means, the specific exhaust gas component is judged not to be purified sufficiently, the control means increases the strength of the electric or electromagnetic field applied by the reaction adjustment means.

Preferably, when, on the basis of the concentration or emission amount of each of a plurality of specific exhaust gas components detected by the status detection means, the plurality of specific exhaust gas components are judged not to be purified sufficiently, the control means changes the frequency of electromagnetic waves successively to a plurality of frequencies corresponding to the plurality of specific exhaust gas components.

Preferably, when, on the basis of the exhaust gas air-fuel ratio detected by the status detection means, emission amount of the specific exhaust gas component is expected to increase, the control means increases the strength of the electric or electromagnetic field applied by the reaction adjustment means.

Preferably, the status detection means detects operating conditions of an apparatus which discharges exhaust gas to the exhaust gas passage; and on the basis of the operating conditions detected by the status detection means, the control means controls the electric or electromagnetic field applied by the reaction adjustment means while predicting changes in the operating conditions, such that response delay is compensated for.

BRIEF DESCRIPTION OF THE DRAWINGS

FIGS. 4a and 4b are graphs each showing the relationship between an operating condition and catalyst surface electric field;

DESCRIPTION OF THE PREFERRED EMBODIMENTS

Embodiments of the present invention will now be described with reference to the drawings.

Figure 1:
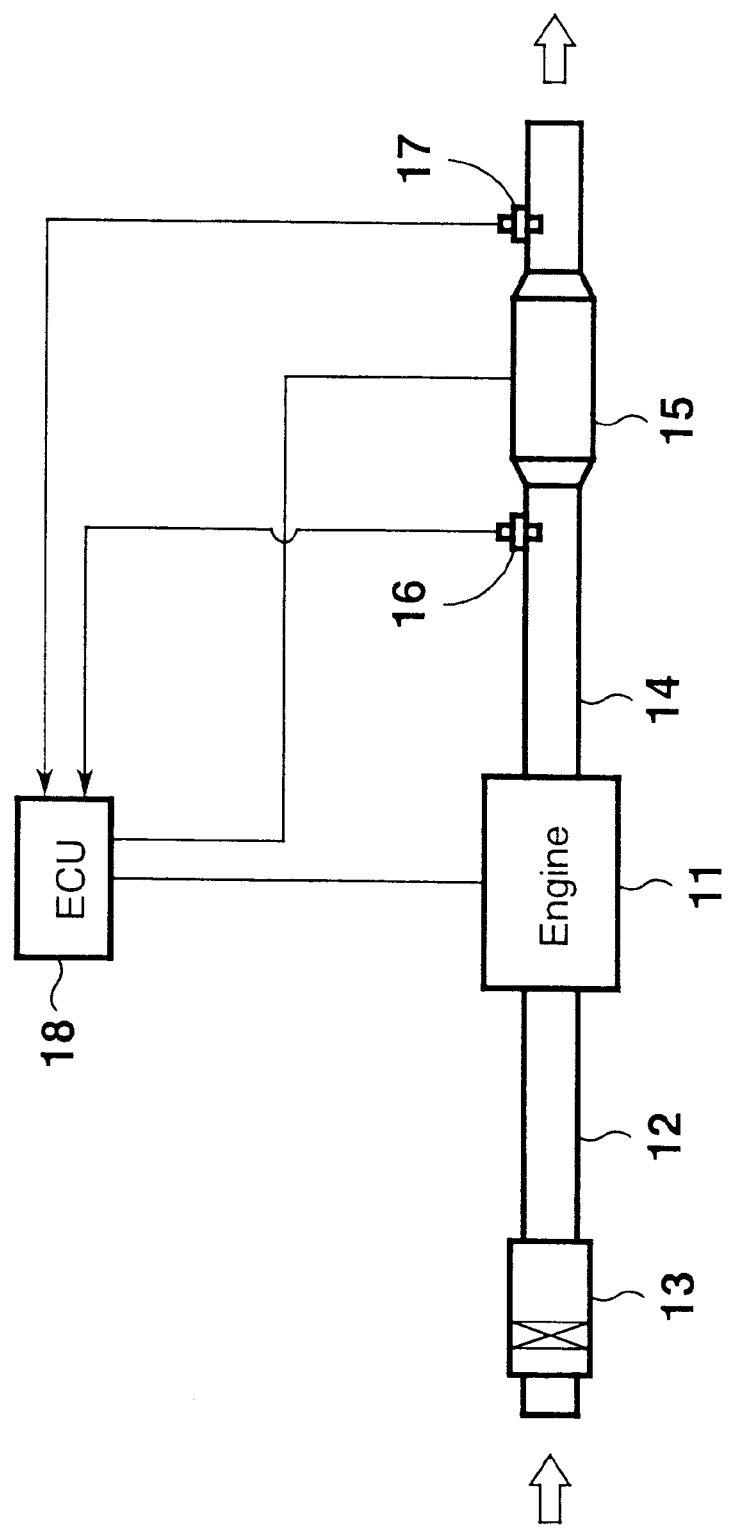
FIG. 1 is a schematic view showing the configuration of an exhaust emission purifier according to a first embodiment of the present invention.

As shown in FIG. 1, which shows an exhaust emission purifier for an engine according to a first embodiment of the present invention, an intake pipe 12 is connected to an intake port of an unillustrated combustion chamber of an engine 11, and an air cleaner 13 is attached to an air intake of the intake pipe 12. Meanwhile, an exhaust pipe 14 is connected to an unillustrated exhaust port of the engine 11, and a three-way catalyst unit 15 serving as an exhaust purifying catalyst unit for purifying toxic substances contained in exhaust gas is provided at a downstream portion of the exhaust pipe 14. A high-temperature sensor 16 is attached to the exhaust pipe 14 on the upstream side of the three-way catalyst unit 15, and an exhaust gas sensor (e.g., an $O_2$ sensor or $NO_x$ sensor) 17 is attached to the exhaust pipe 14 on the downstream side of the three-way catalyst unit 15. Further, an unillustrated muffler is attached to the downstream end of the exhaust pipe 14.

An electronic control unit (ECU) 18 serving as a control apparatus is provided on the vehicle. The ECU 18 includes an input/output unit; a memory unit storing a control program, control maps, and other data; a central processing unit; and timers and counters. The ECU 18 performs total control of the engine 11. Specifically, various pieces of information such as engine speed, accelerator angle, throttle opening, vehicle speed, engine coolant temperature, and intake temperature are input to the ECU 18; and on the basis of the various pieces of information, the ECU 18 determines a fuel injection mode, a fuel injection amount, an ignition timing, etc., and drives and controls an injector and other devices.

In the engine 11 having the above-described structure, a mixture of fuel and air is combusted within the combustion chamber, and exhaust gas is exhausted. The exhaust gas flows into the exhaust pipe 14 and then enters the three-way catalyst unit 15, where toxic substances such as CO, HC, and $NO_x$ contained in the exhaust gas are purified. The thus-purified exhaust gas is released to the atmosphere via the muffler. However, the purifying performance of catalyst of the three-way catalyst unit 15 may deteriorate under low-temperature operating conditions such as low-temperature startup or idling operation of the engine 11.

In view of the foregoing, In the exhaust emission purifier for an internal combustion engine according to the present embodiment, electrodes serving as reaction adjustment means are provided in order to apply an electric field to the vicinity of the surface of the three-way catalyst unit 15 to thereby adjust the reaction by catalyst. Factors which affect the exhaust gas purifying performance of the three-way catalyst unit 15 are detected (by status detection means); and on the basis of the detected factors the ECU 18 (control means) controls the electric field applied by the electrodes.

The factors which affect the exhaust gas purifying performance of the three-way catalyst unit 15 are operating conditions of the engine 11; e.g., at least one of engine speed, vehicle speed, engine coolant temperature, intake temperature, exhaust gas temperature, catalyst temperature, engine load, exhaust gas flow rate, toxic exhaust gas value, exhaust gas A/F ratio, and degree of catalyst poisoning. When a plurality of factors are used, the factors may be added together, averaged, weighted, or selected in accordance with operating conditions.

The above-described factors can be classified into parameters which affect catalyst temperature, parameters which affect catalyst reaction performance (speed), parameters which affect deterioration of the purifying performance of catalyst, and parameters which affect the purifying performance (speed) of catalyst for a specific exhaust gas component.

Examples of the parameters which affect catalyst temperature include exhaust gas temperature, vehicle speed, engine coolant temperature, intake temperature, and catalyst temperature (or catalyst inlet temperature). For example, when exhaust gas temperature or catalyst temperature is low, electricity supplied to the electrodes (reaction adjustment means) is controlled in order to increase the strength of an applied electric or electromagnetic field. Further, when the coolant temperature of the engine is low, HC emission increases due to misfire or poor combustion, and due to low wall temperature of the combustion chamber, the quench zone increases, with a resultant increase in HC emission. Therefore, in this case, electricity supplied to the electrodes is controlled in order to increase the strength of the applied electric or electromagnetic field. When catalyst temperature or exhaust gas temperature is high, electricity supplied to the electrodes is controlled or stopped in order to decrease the strength of the applied electric or electromagnetic field in order to prevent unnecessary reaction, which would otherwise be induced by the applied electric or electromagnetic field.

Examples of parameters which affect catalyst reaction performance (speed) include engine speed, exhaust gas flow rate, and engine load. For example, when exhaust gas flow rate increases, electricity supplied to the electrodes (reaction adjustment means) is controlled in order to increase the strength of the applied electric or electromagnetic field. When the temperature of catalyst or exhaust gas is high, electricity supplied to the electrodes is controlled in order to decrease the strength of the applied electric or electromagnetic field.

An example of the parameters which affect deterioration of the purifying performance of catalyst is the degree of poisoning of catalyst, including at least one of CO poisoning and $O_2$ poisoning; or in the case of $NO_x$ trap catalyst, $NO_x$ poisoning and $SO_x$ poisoning.

Examples of the parameters which affect the performance (speed) of catalyst for purifying a specific exhaust gas component include a value regarding a specific exhaust gas component, and exhaust gas air-fuel ratio. The concentration or emission amount of HC, CO, $NO_x$, etc. is detected as the value regarding a specific exhaust gas component, and when the detected concentration or emission amount of the specific exhaust gas component is expected to be too high to sufficiently purify the specific exhaust gas component, electricity supplied to the electrodes is controlled in order to increase the strength of the applied electric or electromagnetic field. Also, when from a detected exhaust gas air-fuel ratio an increase is expected to arise in the emission amount of the specific exhaust gas component, electricity supplied to the electrodes is controlled in order to increase the strength of the applied electric or electromagnetic field.

Figure 2:
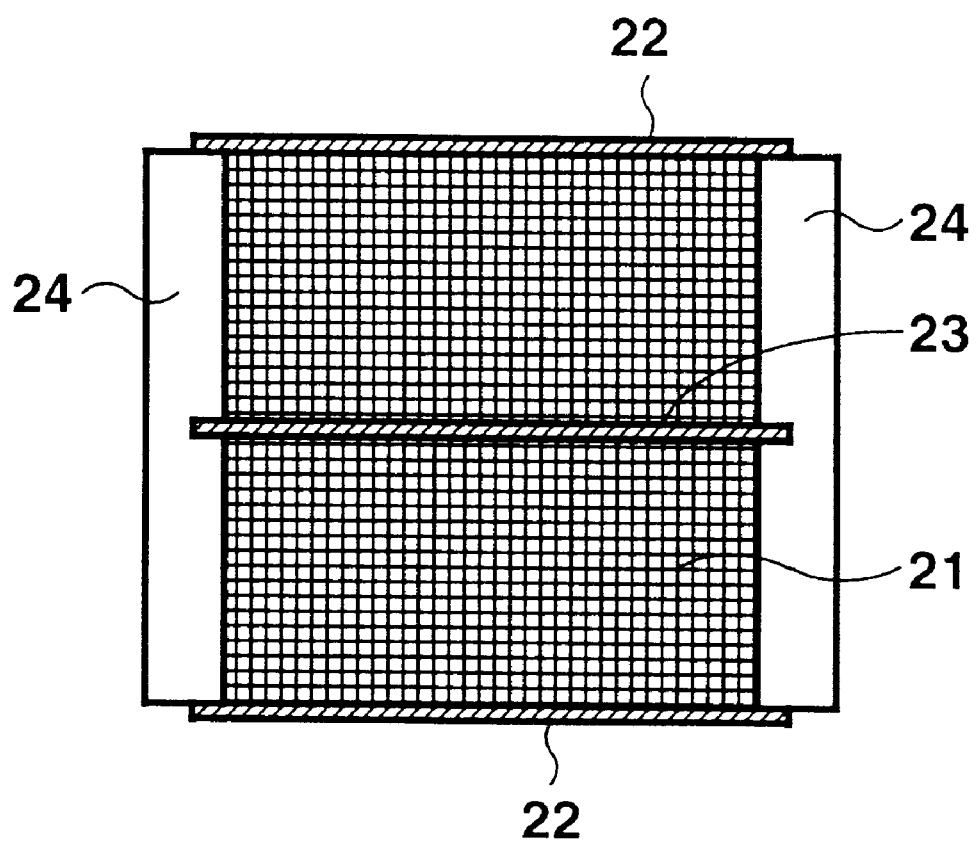
FIG. 2 is a sectional view of a catalyst unit used in the exhaust emission purifier.

As shown in FIG. 2, the three-way catalyst unit 15 is formed of a honeycomb carrier 21 having a large number of exhaust gas passages having a diameter of about 1 mm, and a wash coat carrying a noble metal (e.g., platinum, rhodium, palladium) is applied on the surface of the honeycomb carrier 21. An external electrode 22 is attached to each of the upper and lower surfaces of the honeycomb carrier 21, and an internal electrode 23 is disposed at the center portion of the honeycomb carrier 21. Since the electrodes 22 and 23 are disposed substantially parallel, a layered configuration is formed. Further, insulators 24 are attached to the opposite side surfaces of the honeycomb carrier 21. Voltage is applied between the external electrodes 22 and the internal electrode 23 in order to produce a uniform electric field.

Figure 5:
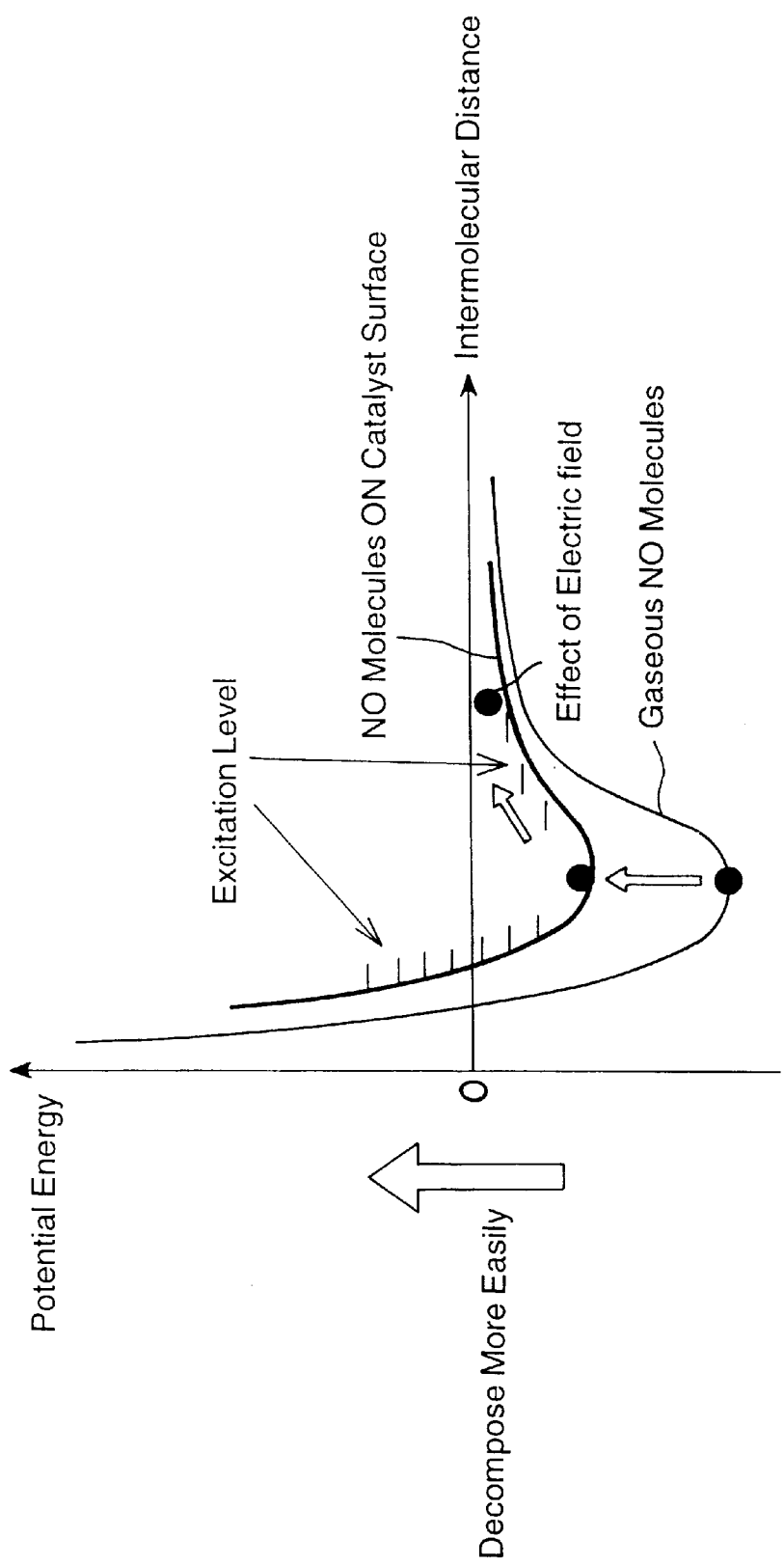
FIG. 5 is a graph showing the relationship between intermolecular distance of NO and potential energy.

Here, the principle of operation for adjusting catalytic reaction through application of an electric field to the vicinity of the surface of the three-way catalyst unit 15 will be described briefly. The graph of FIG. 5 shows the relationship between intermolecular distance of NO molecules and potential energy. As shown in FIG. 5, a potential energy difference exists between gaseous NO molecules and NO molecules on catalyst. When the potential energy of a molecule is high, this means that that molecule has a small dissociation energy (activation energy) and therefore decomposes easily. When an electric field is applied in this state, gaseous NO moves to an excitation level on a potential curve of NO molecules on the catalyst, so that decomposition occurs more easily. The above is the conceivable principle of operation for improving the catalyst performance by application of an electric field.

Figure 6A:
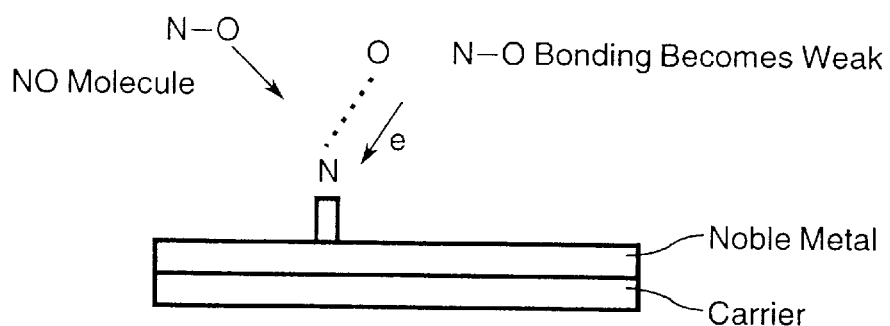
FIGS. 6a to 6c are conceptual views each showing a process of NO decomposition by catalyst.
Figure 6B:
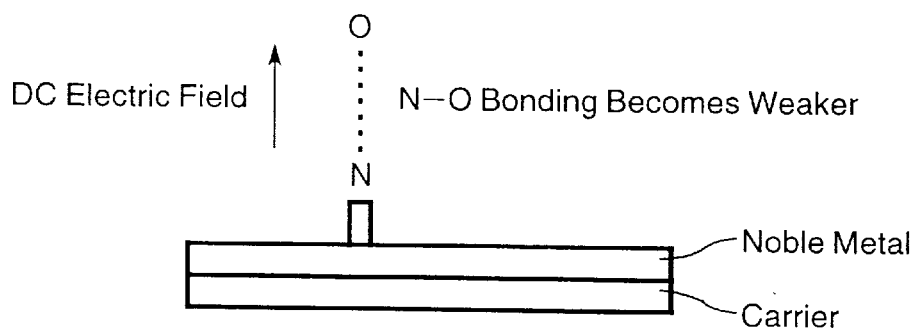
Figure 6C:
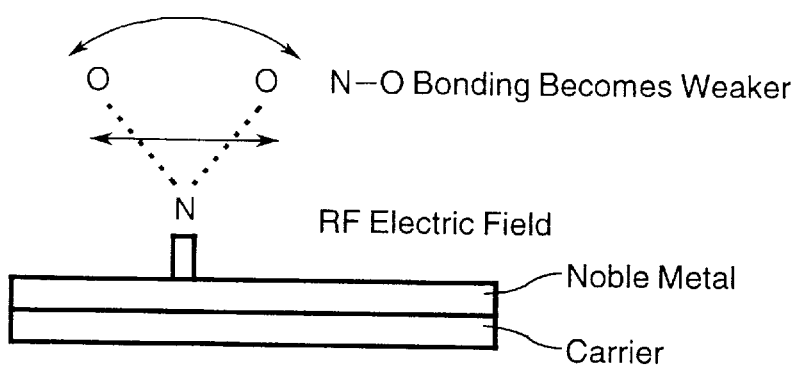

That is, in a case shown in FIG. 6a in which NO molecules are adsorbed by a noble metal carried on a catalyst surface, electrons e of the NO molecules move into the noble metal, so that the potential balance within the NO molecules is upset, and the N—O bonding force is weakened. When, as shown in FIG. 6b, a DC electric field is applied to the catalyst in this state, the intermolecular distance of NO molecules is increased by the electric field, because the adsorbed NO molecules have polarities. Due to the potential energy added by means of the electric field, the potential energies of the NO molecules increase further. As a result, the N—O bonding strength becomes weaker, and decomposition occurs easily. When, as shown in FIG. 6C, an RF electric field is applied to the catalyst in this state, the NO molecules are vibrated by the electric field, because the adsorbed NO molecules have polarities as in the above-described case, so that the NO molecules oscillate. As a result, the potential energies of the NO molecules increase, and the NO molecules enter a vibration excited state, whereby the N—O bonding strength becomes weaker, and decomposition occurs easily.

Figure 3:
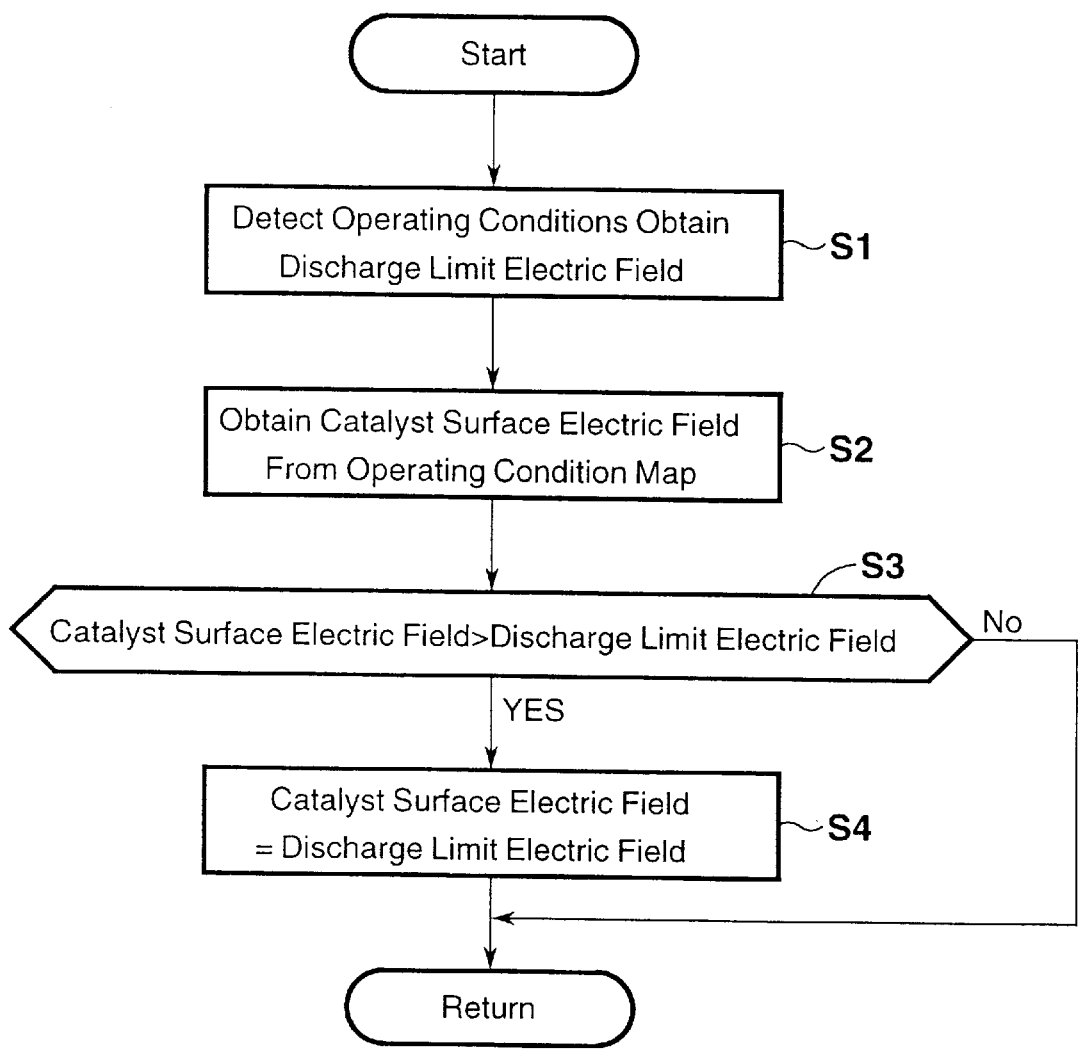
FIG. 3 is a flowchart showing control effected by the exhaust emission purifier.

Next, control of the three-way catalyst unit 15 effected by the above-described exhaust emission purifier for an internal combustion engine according to the present embodiment will be described with reference to the flowchart of FIG. 3 and operation condition maps of FIGS. 4a and 4b.

First, in step S1, operating conditions of the engine 11 or the like are detected; and a discharge limit electric field of the three-way catalyst unit 15 is obtained. As described above, the operation conditions include one or more conditions selected from engine speed, vehicle speed, engine coolant temperature, intake temperature, exhaust gas temperature, catalyst temperature, exhaust gas flow rate, toxic exhaust gas value, exhaust gas A/F ratio, and degree of catalyst poisoning. The discharge limit electric field is obtained from a map which is referred to on the basis of one or more values selected from catalyst temperature, exhaust gas temperature, inter-electrode applied electric field, and exhaust gas density within catalyst. These values are detected by use of a flow rate sensor, a pressure sensor, and other sensors, as well as the high-temperature sensor 16 and the exhaust gas sensor 17. When the discharge limit electric field is obtained from discharge current which is predicted or actually measured by making use of a current sensor or voltage sensor, the detection accuracy can be improved further.

In step S2, a catalyst surface electric field is obtained from the operation condition map. As shown in FIG. 4a, the catalyst surface electric field is changed in accordance with catalyst inlet temperature, which is detected as an operating condition. Alternatively, as shown in FIG. 4b, the catalyst surface electric field is changed in accordance with the degree of catalyst poisoning, which is detected as an operating condition. In the present embodiment, the catalyst inlet temperature is detected by the high-temperature sensor 16, and the degree of catalyst poisoning is detected by the exhaust gas sensor 17. However, these values may be obtained with reference to a map and on the basis of the operating conditions. In the case in which poisoning occurs within a relatively short period, the catalyst surface electric field is increased or decreased at intervals of 1 sec or less. In the case in which poisoning occurs over a relatively long period, the catalyst surface electric field is increased or decreased at intervals of one week or more.

Examples of harmful substances which cause poisoning include THC, CO, $NO_x$, $SO_x$, $H_2S$, $NH_3$, $N_2O$, and particulate matter. One or more harmful substances may be detected as a poisoning substance. The harmful substances may be measured by use of the exhaust gas sensor or obtained with reference to a map and on the basis of the operating conditions. Moreover, a harmful-exhaust-gas increasing coefficient which is obtained through weighting as follows may be used.

Harmful-exhaust-gas increasing coefficient=$\Sigma\{NO_x$ weighting coefficient×$NO_x$ emission+THC weighting coefficient×THC emission+CO weighting coefficient×CO emission$\}$ Examples of poisoning of catalyst include CO poisoning and $O_2$ poisoning; and in the case of $NO_x$ trap catalyst, $NO_x$ poisoning and $SO_x$ poisoning.

Moreover, changes in the operating conditions may be predicted, on the basis of which the catalyst surface electric field may be increased and decreased to thereby compensate for response delay. A value indicating the strength of the catalyst surface electric field obtained from a map may assume a negative value. However, when an ultimately-determined strength of the catalyst surface electric field assumes a negative value, the strength of the catalyst surface electric field is set to zero. If necessary, the direction of the electric field is changed such that the catalyst is charged in positive and negative alternately, to thereby utilize the entire catalyst effectively.

After the catalyst surface electric field is determined in the above-described manner, in step S3, a judgment is made as to whether the strength of the catalyst surface electric field is stronger than that of the discharge limit electric field. When the catalyst surface electric field is stronger than the discharge limit electric field, in step S4, the strength of the catalyst surface electric field is set to be equal to that of the discharge limit electric field. When the catalyst surface electric field is weaker than the discharge limit electric field, the strength of the catalyst surface electric field is maintained unchanged.

The strength of the catalyst surface electric field can be changed through control of the electric field produced between the electrodes. Preferably, the strength of the catalyst surface electric field is set to satisfy the following conditions.

Catalyst surface electric field E(kV/cm)$\geq$(dissociation energy of exhaust gas (eV)/average free path of exhaust gas electrons ($\mu$m))×[(activation temperature of catalyst (K)−catalyst inlet temperature (K))/activation temperature of catalyst (K)]×10

For example, when the dissociation energy of exhaust gas=15.6 eV, the average free path of exhaust gas electrons=

0.375 µm, the activation temperature of catalyst=300° C., and the catalyst inlet temperature=25° C., the catalyst surface electric field E must be equal to or greater than 200 kV/cm (i.e., E≧200 kV/cm). The catalyst inlet temperature (K) may be the catalyst temperature.

The above-described determination of discharge limit electric field by reference to an operating condition map is a mere example. When a catalyst unit other than the three-way catalyst unit 15, such as an $NO_x$ trap catalyst unit, a selective-reduction-type $NO_x$ catalyst unit, or an HC-adsorption catalyst unit, is used, the discharge limit electric field is set such that the individual catalyst units operate optimally. When an electromagnetic field is applied and an exhaust gas to be purified contains a plurality of components, the plurality of components can be purified through sequentially switching the frequency of the electromagnetic field to different frequencies.

As described above, in the exhaust emission purifier for an internal combustion engine according to the present embodiment, the electrodes 22 and 23 are attached to the three-way catalyst unit 15 in order to apply an electrical field to the vicinity of the catalyst surface to thereby adjust the catalytic reaction in accordance with operating conditions, whereby the potential energy of exhaust gas is increased in accordance with the characteristics of catalyst. In particular, a temperature region suitable for each catalyst exists, and in general, the catalyst is heated to and maintained in that temperature region. By contrast, in the present embodiment, the potential energy of exhaust gas is increased by means of an electric field generated through application of voltage to the electrodes 22 and 23, whereby catalytic reaction is activated without necessity of increasing the temperature of catalyst.

The increase in potential energy is considered to occur due to activation of electrons or molecules of exhaust gas, decreased height of potential barrier, and/or decreased thickness of the potential barrier.

Figure 7:
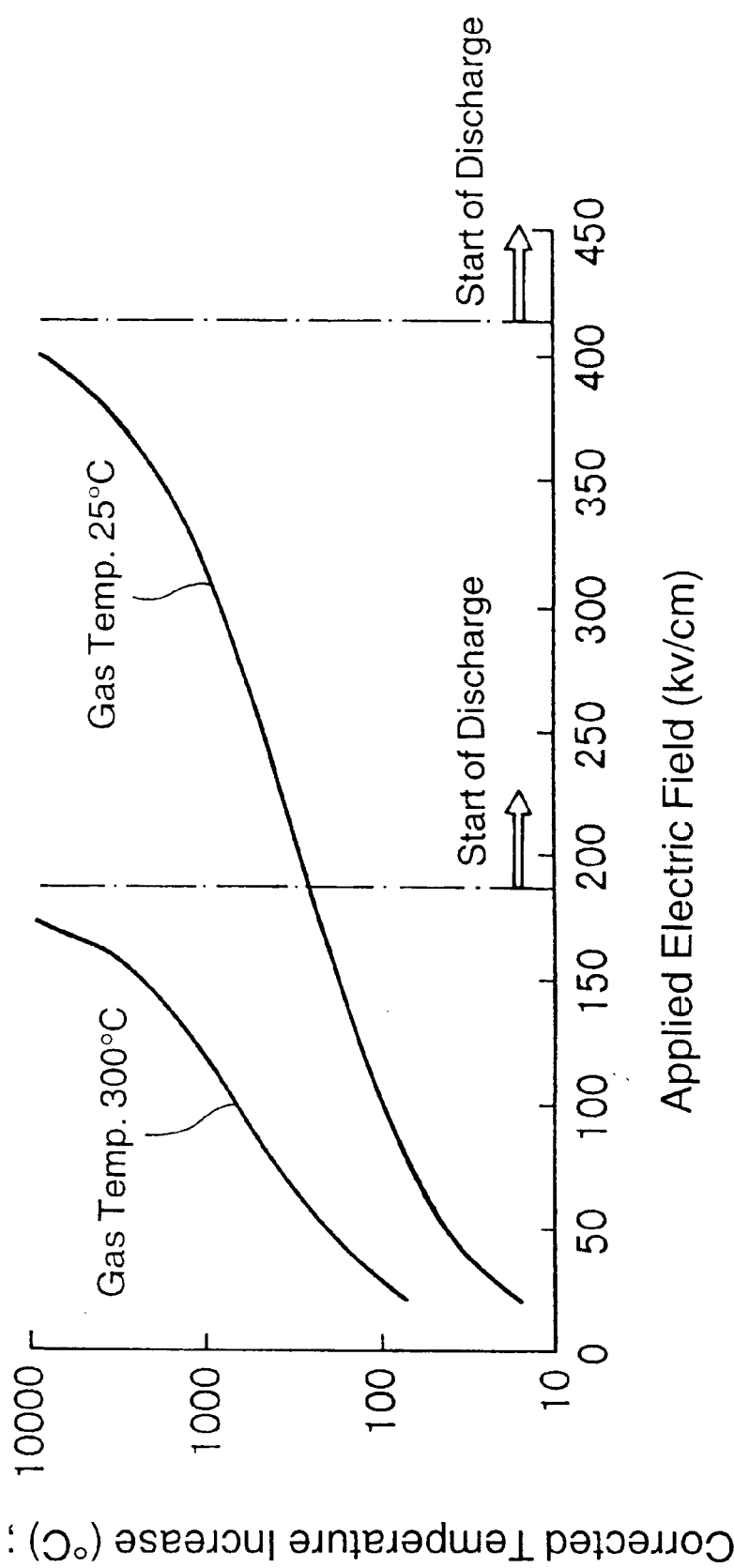
FIG. 7 is a graph-showing the relationship between applied electric field and corrected temperature increase of catalyst.

Specifically, as shown in FIG. 7, when catalytic inlet temperature and exhaust gas temperature are both 25° C., the strength of the discharge limit electric field at which a predominant portion of gas molecules start dissociation is about 420 kV/cm; and when the exhaust gas temperature is 300° C., the strength of the discharge limit electric field at which a predominant portion of gas molecules start dissociation is about 180 kV/cm. These values can be obtained from the relationship between average free path of gas molecules and electrons, and dissociation energy of gas molecules.

In the present embodiment, the speed of catalytic reaction and the speeds of reactions (including adsorption, dissociation, and desorption) required in catalytic reaction can be controlled. In particular, when an $NO_x$ trap catalyst unit is used, through changing the discharge limit electric field, it becomes possible to suppress unnecessary reactions which occur in the $NO_x$ trap catalyst unit at 600° C. or higher, such as dissociation reaction of nitrates, and oxidation reaction of THC, which occurs preferentially for $O_2$ over $NO_x$. In addition, CO, $O_2$, $NO_x$, $SO_x$, etc. which have poisoned catalyst can be removed in order to regenerate the catalyst. Moreover, the present embodiment can save electrical power as compared with exhaust emission purifiers in which toxic components contained in exhaust gas are brought into a plasma state and are decomposed directly.

Figure 8:
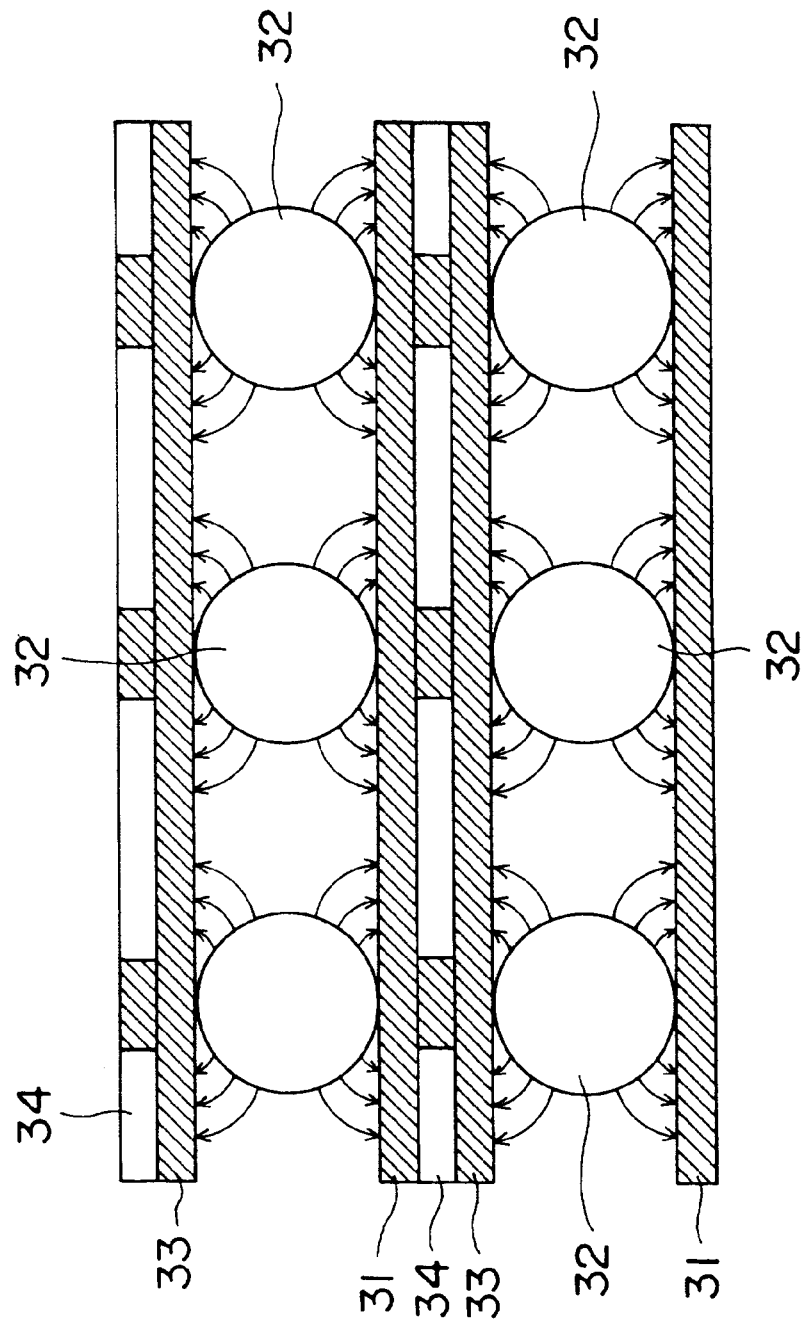
FIG. 8 is a sectional view of a catalyst unit used in an exhaust emission purifier according to a second embodiment of the present invention.

In the above-described embodiment, the external electrodes 22 and the internal electrode 23 are provided substantially parallel on the honeycomb carrier 21 of the three-way catalyst unit 15 to thereby obtain a uniform electric field. However, a structure as shown in FIG. 8 may be employed. In the structure shown in FIG. 8, a plurality of cylindrical internal electrodes (metal electrodes) 32 are attached to the surface of a catalyst layer (wash coat+noble metal) 31; a dielectric body (ceramic carrier) 33 is provided on the internal electrodes 32; and an external electrode 34 is provided on the dielectric body 33 in order to form a layered structure. This structure generates a non-uniform electric field such that a strong electric field is generated only in the vicinity of locations where the internal electrodes 32 are in contact with the catalyst layer 31.

Figure 9:
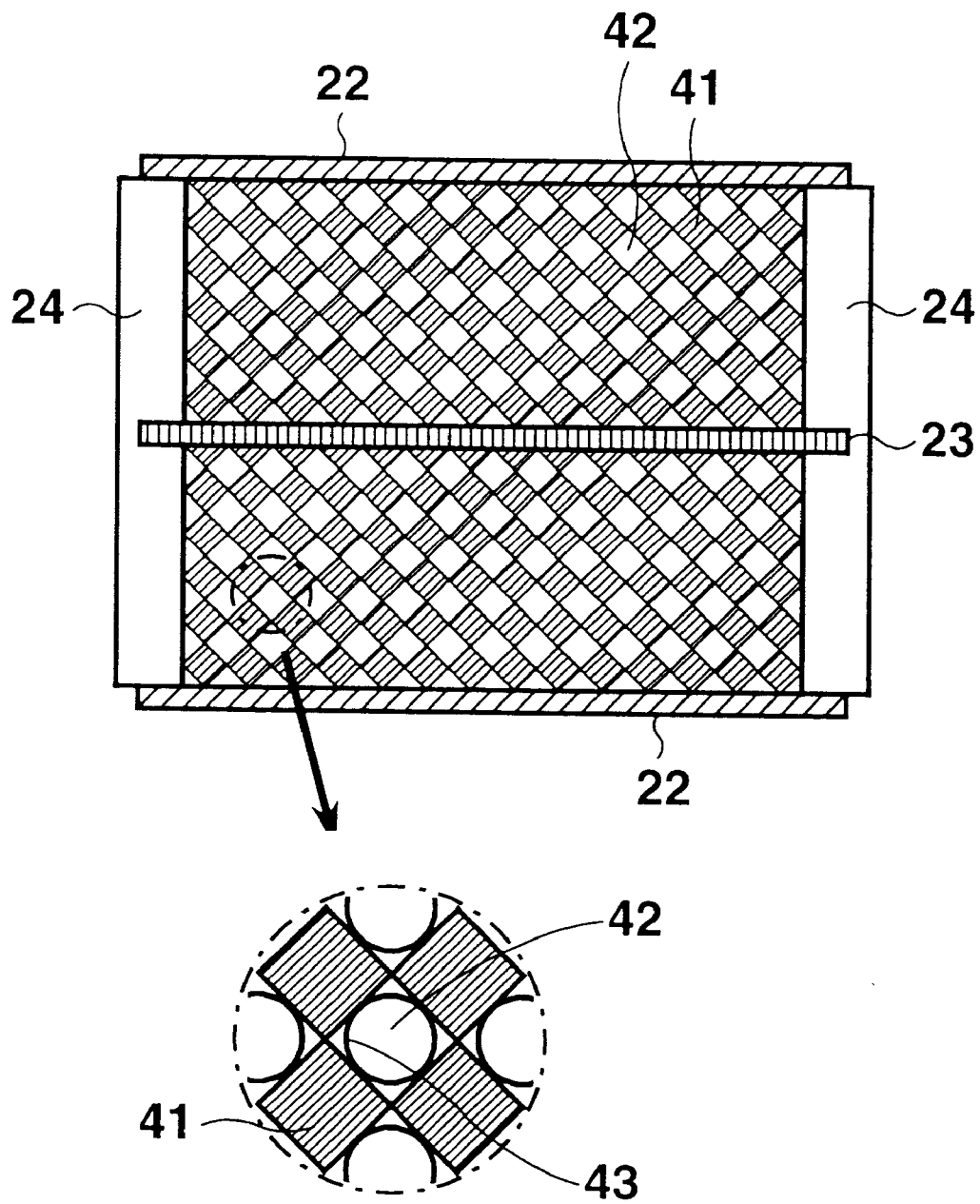
FIG. 9 is a sectional view of a catalyst unit used in an exhaust emission purifier according to a third embodiment of the present invention.

Moreover, a structure as shown in FIG. 9 may be employed. In the structure shown in FIG. 9, dielectric bodies (carriers) 41 are disposed in order to reduce the total cross sectional area of the dielectric bodies as measured along a plane perpendicular to the direction of the electric field, to thereby generate a strong electric field in each exhaust gas passage 42 in the vicinity of the surface of catalyst 43.

In the above-described embodiment, an electric field is applied to the vicinity of the surface of the three-way catalyst unit 15 to thereby increase the potential energy of exhaust gas by an amount suitable to the characteristics of the catalyst. However, the embodiment may be modified as follows. A magnetron for generating electromagnetic waves is provided as reaction adjustment means in order to apply an electromagnetic field to the vicinity of the surface of the three-way catalyst unit 15 to thereby adjust the reaction of catalyst; factors which affect the exhaust gas purifying performance of the three-way catalyst unit 15 are detected; and on the basis of the detected factors the ECU 18 controls the electromagnetic field applied by the magnetron.

In the above-described embodiment, the three-way catalyst unit 15 is provided as an exhaust purifying catalyst of the exhaust pipe 14, and the electrodes 22 and 23 are provided on the three-way catalyst unit 15. However, an $NO_x$ catalyst unit or a THC adsorption catalyst unit may be used in place of the three-way catalyst unit 15.

As have been described in detail, in the exhaust emission purifier for an internal combustion engine according to the present invention, a catalyst for purifying toxic substances contained in exhaust gas is disposed in an exhaust gas passage; reaction adjustment means adjusts catalytic reaction through application of an electric or electromagnetic field to the vicinity of a surface of the catalyst; status detection means detects a factor which affects the exhaust gas purifying performance of the catalyst; and control means controls the electric or electromagnetic field applied by the reaction adjustment means, on the basis of the detected factor. Therefore, stable performance for purifying exhaust gas by means of catalytic reaction can be secured, and electrical power can be conserved as compared with exhaust emission purifiers in which toxic components contained in exhaust gas are brought into a plasma state and are decomposed directly.

What is claimed is:

1. An exhaust emission purifier comprising:
    catalyst disposed in an exhaust gas passage in order to purify toxic substances contained in exhaust gas;
    reaction adjustment means for adjusting reaction by said catalyst through application of an electric or electromagnetic field to the vicinity of a surface of said catalyst;
    status detection means for detecting a factor which affects the exhaust gas purifying performance of said catalyst; and
    control means for controlling the electric or electromagnetic field applied by said reaction adjustment means, on the basis of the factor detected by said status detection means.

2. An exhaust emission purifier according to claim 1, wherein said status detection means detects, as the factor which affects the exhaust gas purifying performance, one selected from a parameter which affects catalyst temperature, a parameter which affects catalyst reaction performance, a parameter which affects deterioration of the purifying performance of the catalyst, and a parameter which affects the purifying performance of the catalyst for a specific exhaust gas component.

3. An exhaust emission purifier according to claim 2, wherein said status detection means detects, as the parameter which affects catalyst temperature, one selected from exhaust gas temperature, engine coolant temperature, and catalyst temperature; and on the basis of the parameter which is detected by said status detection means and which affects catalyst temperature, said control means controls the electric or electromagnetic field applied by said reaction adjustment means.

4. An exhaust emission purifier according to claim 3, wherein, on the basis of the parameter which is detected by said status detection means and which affects catalyst temperature, said control means judges whether the catalytic temperature falls within a temperature range in which the performance of the catalyst deteriorates; and when the catalytic temperature falls within the temperature range in which the performance of the catalyst deteriorates, said control means increases the strength of the electric or electromagnetic field applied by the reaction adjustment means.

5. An exhaust emission purifier according to claim 4, wherein said control means controls the strength of the electric or electromagnetic field applied by the reaction adjustment means so as not to exceed a discharge limit electric field.

6. An exhaust emission purifier according to claim 2, wherein said status detection means detects, as the parameter which affects catalyst reaction performance, one selected from engine speed, exhaust gas flow rate, and engine load; and on the basis of the parameter which is detected by said status detection means and which affects catalyst reaction performance, said control means controls the electric or electromagnetic field applied by said reaction adjustment means.

7. An exhaust emission purifier according to claim 6, wherein, on the basis of the parameter which is detected by said status detection means and which affects catalyst reaction performance, said control means judges whether the engine is in an operation range in which the performance of the catalyst deteriorates; and when the engine is in the operation range in which the performance of the catalyst deteriorates, said control means increases the strength of the electric or electromagnetic field applied by the reaction adjustment means.

8. An exhaust emission purifier according to claim 7, wherein said control means controls the strength of the electric or electromagnetic field applied by the reaction adjustment means so as not to exceed a discharge limit electric field.

9. An exhaust emission purifier according to claim 2, wherein said status detection means detects, as the parameter which affects catalyst temperature, one selected from exhaust gas temperature, engine coolant temperature, and catalyst temperature, and detects, as the parameter which affects catalyst reaction performance, one selected from engine speed, exhaust gas flow rate, and engine load; and on the basis of the parameter which is detected by said status detection means and which affects catalyst temperature and the parameter which is detected by said status detection means and which affects catalyst reaction performance, said control means controls the electric or electromagnetic field applied by said reaction adjustment means.

10. An exhaust emission purifier according to claim 9, wherein said control means judges, on the basis of the parameter which is detected by said status detection means and which affects catalyst reaction performance, whether the engine is in an operation range in which the performance of the catalyst deteriorates and judges, on the basis of the parameter which is detected by said status detection means and which affects catalyst temperature, whether the catalyst temperature falls within a temperature range in which the performance of the catalyst increases; and when the engine is in the operation range in which the performance of the catalyst deteriorates and the catalytic temperature falls within the temperature range in which the performance of the catalyst increases, said control means decreases the strength of the electric or electromagnetic field applied by the reaction adjustment means.

11. An exhaust emission purifier according to claim 2, wherein said status detection means detects, as the parameter which affects deterioration of the catalyst reaction performance, the degree of a specific catalyst poisoning among a plurality of catalytic poisonings; and on the basis of the degree of the specific catalyst poisoning detected by said status detection means, said control means controls the electric or electromagnetic field applied by said reaction adjustment means.

12. An exhaust emission purifier according to claim 11, wherein said status detection means detects, as the parameter which affects deterioration of the catalyst reaction performance, the degree of a specific catalyst poisoning selected from CO poisoning, $O_2$ poisoning, $NO_x$ poisoning, and $SO_x$ poisoning; and when the degree of the specific catalyst poisoning detected by said status detection means exceeds a reference value set for the specific catalyst poisoning, said control means controls the electric or electromagnetic field applied by said reaction adjustment means in order to remove the specific catalyst poisoning to thereby regenerate the catalyst.

13. An exhaust emission purifier according to claim 2, wherein said status detection means detects, as the parameter which affects the purifying performance of the catalyst for a specific exhaust gas component, one selected from concentration of the specific exhaust gas component, emission amount of the specific exhaust gas component, and exhaust gas air-fuel ratio; and on the basis of the parameter which is detected by said status detection means and which affects the purifying performance of the catalyst for the specific exhaust gas component, said control means controls the electric or electromagnetic field applied by said reaction adjustment means.

14. An exhaust emission purifier according to claim 13, wherein when, on the basis of the concentration or emission amount of the specific exhaust gas component detected by said status detection means, the specific exhaust gas component is judged not to be purified sufficiently, said control means increases the strength of the electric or electromagnetic field applied by said reaction adjustment means.

15. An exhaust emission purifier according to claim 14, wherein when, on the basis of the concentration or emission amount of each of a plurality of specific exhaust gas components detected by said status detection means, the specific exhaust gas components are judged not to be purified sufficiently, said control means changes the frequency of electromagnetic waves successively to a plurality of frequencies corresponding to the plurality of specific exhaust gas components.

16. An exhaust emission purifier according to claim 13, wherein when, on the basis of the exhaust gas air-fuel ratio detected by said status detection means, emission amount of the specific exhaust gas component is expected to increase, said control means increases the strength of the electric or electromagnetic field applied by said reaction adjustment means.

17. An exhaust emission purifier according to claim 1, wherein said status detection means detects operating conditions of an apparatus which discharges exhaust gas to said exhaust gas passage; and on the basis of the operating conditions detected by said status detection means, said control means controls the electric or electromagnetic field applied by said reaction adjustment means while predicting changes in the operating conditions, such that response delay is compensated for.

* * * * *